(No Model.)
A. G. BELL & S. TAINTER.
Photophone Transmitter.
No. 235,496. Patented Dec. 14, 1880.
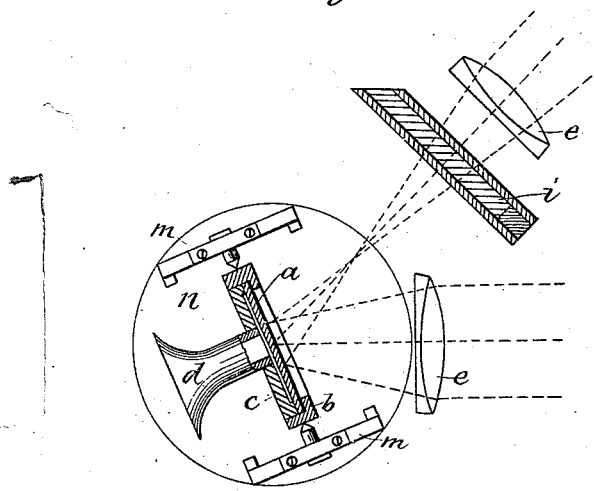
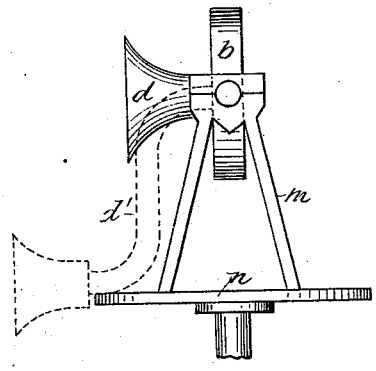
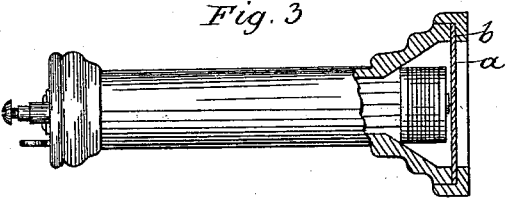
Witnesses:
E. E. Masson
Philip Mauro
Inventors:
Alexander Graham Bell
and Sumner Tainter
by A. Pollok
their Attorney

UNITED STATES PATENT OFFICE.

ALEXANDER G. BELL, OF WASHINGTON, DISTRICT OF COLUMBIA, AND SUMNER TAINTER, OF WATERTOWN, MASSACHUSETTS.

PHOTOPHONE-TRANSMITTER.

SPECIFICATION forming part of Letters Patent No. 235,496, dated December 14, 1880.

Application filed September 25, 1880. (No model.)

*To all whom it may concern:*

Be it known that we, ALEXANDER GRAHAM BELL, of Washington, District of Columbia, and SUMNER TAINTER, of Watertown, county of Middlesex, State of Massachusetts, have invented a new and useful Improvement in Photophone-Transmitters, of which the following description, in connection with the accompanying drawings, is a specification.

Our invention relates to a photophone-transmitter, or instrument for controlling a radiant beam and imparting to it a varying character, whereby in falling on an appropriate receiving-instrument the said beam may be made to produce sound.

In an application for United States Letters Patent filed by A. G. Bell, August 28, 1880, an apparatus was described for transmitting sound or reproducing it at a distant point by the agency of rays from the sun and other radiant bodies. A beam of rays falling on a suitable sensitive receiver produces an effect therein proportional to the amount or effective strength of the beam falling on it, and the said receiver thus effected is capable of imparting vibrations to the air or producing sound. In the said application various instruments were described for controlling the beam, the instruments themselves being controlled by air-vibrations or the voice of a speaker.

One of the forms therein described, but not claimed, forms the subject of the present application, and consists, mainly, of a mirror or reflector, upon which the beam from the radiant body falls and from which it is reflected toward the sensitive receiving-instrument.

It will be seen that the path of any ray from the said reflector will depend on the angle at which the portion of the reflector on which the ray falls is presented to the said ray. Whether a given ray will or will not fall upon the receiver consequently depends on the position of the reflecting-surface, and consequently any change in the angular position or form of the said surface or portions thereof will produce changes in the amount of radiant energy falling on the said receiver.

The reflector is made of some material as glass silvered or provided with any suitable reflecting metallic surface, or thin polished metal which can be set in vibration in accordance with sound-waves, either by the air-waves themselves or by similarly variable forces, as the magnetic impulses produced by an undulatory electric current. As the said reflector vibrates each portion of its surface departs from its normal position and bends or tips more or less in one direction or the other, so that each ray reflected from it is more or less diverted from its normal path, and thereby the total amount of radiant energy exerted on the sensitive receiver by all the rays reflected from the transmitter varies at each instant.

The extent of variation from instant to instant, the direction of the variation, the period of each variation, and the character of each variation depend on the vibrational movement of the transmitting-reflector which causes the changes, and therefore the same character of vibrational movement given to the transmitter by the voice reappears in the vibrations in the radiant energy operative upon the sensitive part of the receiver, and consequently in the sound or other effects due to the changes in that sensitive body. The words spoken against the transmitter are thereupon heard to proceed from the receiver. Articulate speech has thus been transmitted, using as a reflector a disk of silvered glass thirty inches in diameter, of tolerable thickness, and clearer and better articulation has been obtained by using as a reflector a disk of thin glass as is used for mounting objects for the microscope, properly silvered, and about two inches in diameter.

The reflector may be mounted in a frame or case provided with a mouth-piece such as is commonly used in telephones. It is essential that the reflector should be so held that its position should always be such in relation to the source of rays and the receiver that the rays may be directed to the receiver.

It will sometimes be desirable—as when the radiant source is movable or the same transmitter is to be used with receivers at different points—to mount the transmitter so as to give it a universal movement. A mounting similar to that of a telescope of a surveyor's transit accomplishes this, and a similar graduated circle is often useful.

The mouth-piece or sound-passage may be made as a flexible tube, to enable it to be readily used with the reflector in any desired angular position.

Figure 1 is a plan view, partly in section, of a photophone-transmitter constructed in accordance with our invention; Fig. 2, a side elevation thereof; and Fig. 3, a modification, in which the reflector is operated or set in vibration by magnetic impulses, the said reflector being a polished diaphragm of a magneto-telephone of common construction.

The reflector $a$ may be of any material capable of receiving a reflecting-surface and of being set in vibration by the impulses of air-waves or similar forces.

Very thin glass, such as used for mounting objects for the microscope, silvered to cause it to reflect rays in the usual manner, and of about the same size as a telephone-diaphragm, has been found to operate well in apparatus of this kind.

When desired to operate the transmitter by the voice directly, it is mounted in a frame, $b$, having a sound-chamber, $c$, and a sound-passage or mouth-piece, $d$, so that in speaking into the said mouth-piece the mirror is set in vibration in the same manner as the diaphragm of a speaking-telephone.

Any suitable means may be employed to direct and concentrate the rays on the reflector $a$, and to give the desired normal direction to the rays reflected therefrom. Such apparatus is shown in Fig. 1, consisting of lenses $e$. A heat-absorbing cell, $i$, is employed to prevent the heat-rays from distorting or injuring the reflector $a$, it being found that the absorption of the said heat-rays is not detrimental to the operation of the apparatus.

In order to enable the reflector to be placed at any desired angle to properly direct the beam of rays from its source to the sensitive receiver, the frame $b$ thereof is pivoted on the standards $m$, rising from a plate, $n$, itself movable about a vertical axis, the line joining the said pivots forming a horizontal axis of rotation for the frame $b$ and mirror $a$ therein, so that by the two movements of the frame $b$ on its pivots and the plate $n$ and standards $m$ on a vertical axis the mirror can be placed at any desired angle.

It may sometimes be desirable to operate the reflector $a$ otherwise than by the direct impulses of air-waves caused by the sound it is desired to reproduce, and one other method is illustrated in Fig. 3. In this instance the reflector $a$ is a diaphragm of magnetic material—as iron or steel—polished on its front surface to reflect the rays. This diaphragm is mounted in the case of an ordinary magneto-telephone, and will be set in vibration by the magnetic impulses produced in the said telephone in the usual manner.

The front portion of the telephone, instead of being formed as a mouth-piece leading to a small chamber in front of the diaphragm, will be entirely open, so as to allow free access of the light to the said reflecting-diaphragm. In either of the forms illustrated the reflector, when set in vibration, will cause a greater or less portion of the rays reflected therefrom to be diverted from their path to the receiver, which they follow when the reflector is at rest, and consequently the energy operating on the receiver will by this method be varied in accordance with the said vibrations, and experiment has proved that these variations may be made to reproduce the sounds by which the reflector was set in vibration.

We claim—

1. An instrument for transmitting sound by radiant energy, consisting of a flexible reflector and frame therefor and means to impart to it a vibrational movement corresponding to the sound-waves it is desired to transmit, substantially as described.

2. A sound-chamber and sound-passage leading thereto and a flexible mirror arranged to form one of the sides of the sound-chamber, whereby sound-waves entering the sound-chamber impart a vibrational movement to the said mirror, and it impresses a similarly varying character on a beam of rays reflected therefrom, substantially as described.

3. The herein-described method of producing definite characteristic variations in the amount of radiant energy transmitted to a receiver, which consists in reflecting a beam of rays from a reflector capable of receiving a vibrational movement and imparting to the said reflector a vibrational movement having the character of the variations it is desired to produce in the beam reflected therefrom, substantially as and for the purpose set forth.

In testimony whereof we have signed our names to this specification in the presence of two subscribing witnesses.

ALEXANDER GRAHAM BELL.
  SUMNER TAINTER.

Witnesses to signature of Alexander Graham Bell:
  ALFRED J. MAYO,
  C. H. GREAVES.

Witnesses to signature of Sumner Tainter:
  PHILIP MAURO,
  BARTRAM ZEVELY.